United States Patent
Chua et al.

(10) Patent No.: US 6,628,647 B1
(45) Date of Patent: Sep. 30, 2003

(54) INTERNET NETWORK BASED TELEPHONE CALL FORWARDING SYSTEM AND METHOD

(75) Inventors: Kee Chaing Chua, Gillman Heights (SG); Cheng Lin Tan, Jim Rumah Tinggi (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 09/281,728

(22) Filed: Mar. 30, 1999

(30) Foreign Application Priority Data

May 4, 1998 (SG) .............................. 9800999

(51) Int. Cl.[7] .......................... H04L 12/56; H04L 12/64
(52) U.S. Cl. ...................... 370/356; 370/328; 370/351; 370/352; 370/902; 370/912; 370/913
(58) Field of Search ................................ 370/310, 328, 370/351, 352, 353, 354, 355, 356, 901, 902, 912, 913; 709/245

(56) References Cited

U.S. PATENT DOCUMENTS

| | | | | |
|---|---|---|---|---|
| 5,325,362 A | * | 6/1994 | Aziz | 370/94.3 |
| 6,061,650 A | * | 5/2000 | Malkin et al. | 704/228 |
| 6,144,671 A | * | 11/2000 | Perinpanathan et al. | 370/409 |
| 6,195,705 B1 | * | 2/2001 | Leung | 709/245 |
| 6,230,012 B1 | * | 5/2001 | Willkie et al. | 455/435 |

FOREIGN PATENT DOCUMENTS

| | | |
|---|---|---|
| WO | WO 97/16916 A1 | 5/1997 |
| WO | WO 97/39560 | 10/1997 |
| WO | WO 98/05145 | 2/1998 |
| WO | WO 98/11699 | 3/1998 |
| WO | WO 98/12860 | 3/1998 |
| WO | WO 98/13986 A1 | 4/1998 |

OTHER PUBLICATIONS

Search Report and Written Opinion, Austrian Patent Office, May 21, 1999, concerning corresponding application No. 9800999–6, 9pages.

* cited by examiner

*Primary Examiner*—Hassan Kizou
*Assistant Examiner*—Joe Logsdon
(74) *Attorney, Agent, or Firm*—ipsolon LLP (57) ABSTRACT

An Internet network based telephone call forwarding system comprising a home unit to which a user's telephone calls are directed and a remote unit to which a user's telephone calls are forwarded, wherein the home unit has an incoming line connectable to a telephone network and an outgoing line connectable to an Internet network and the remote unit has a line connectable to the Internet network, wherein the home unit is operable to forward calls directed to the home unit on the incoming line to the remote unit on the outgoing line via the Internet network.

21 Claims, 9 Drawing Sheets

INTERNET NETWORK BASED TELEPHONE CALL FORWARDING SYSTEM AND METHOD

THIS INVENTION relates to an Internet network based telephone call forwarding system and method and more particularly to an Internet network based telephone call forwarding system for forwarding calls from a home unit to a portable remote unit via the Internet network.

The use of the Internet to carry voice telephony services is becoming more widespread as high capacity links are used and new protocols are employed which support delay-sensitive (real-time) traffic. The main advantage of using the Internet for voice telephony services is that of lower cost. This is due inherently to the fact that the Internet uses packet switching technologies that allow statistical multiplexing, and hence, the shared use of the network. Further, telephone calls to establish communication with the Internet are only charged usually at local rates between the service user and the service provider. The reduced cost of using the Internet for voice telephony services is evident in the growing popularity of this service, especially for long-distance calls. No voice telephony services using the Internet enable the forwarding or transfer of a telephone call via the Internet.

Further, all conventional voice telephony services over the Internet require the installation of specialised servers by the Internet service providers. The user then connects to the Internet to access the specialised server which then connects the call between the user and the callee.

An object of the present invention is to seek to provide a telephone call forwarding or transfer system for forwarding or transferring calls via the Internet.

Preferably, the telephone call forwarding or transfer system may not require the installation of a specialised server in the network of the Internet service provider.

In order that the present inventioin may be more readily understood, embodiments thereof will now be described, by way of example, with reference to the accompanying drawings, in which.

Figure 1:
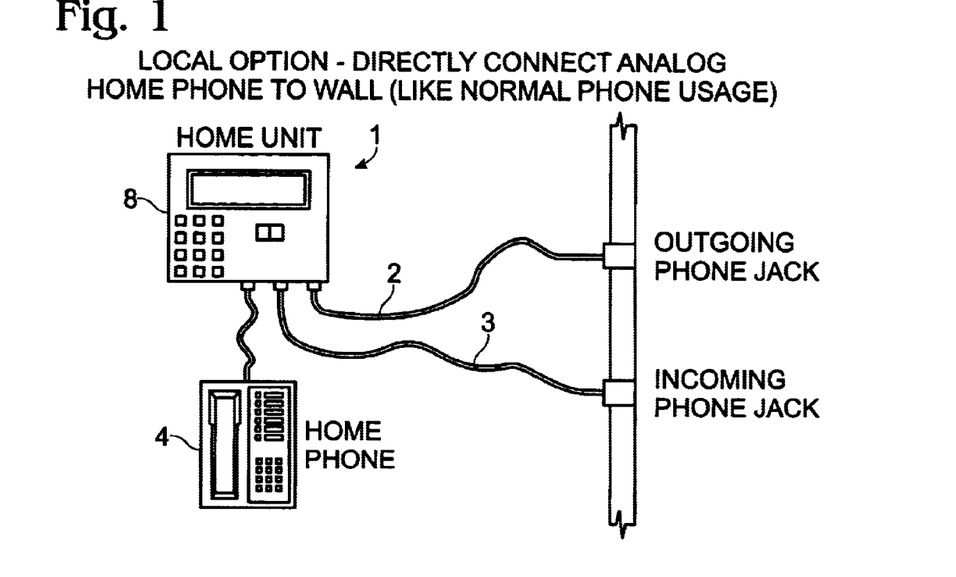
FIG. 1 shows a schematic representation of a home unit for use with an Internet network based telephone call forwarding system embodying the present invention.
Figure 2:
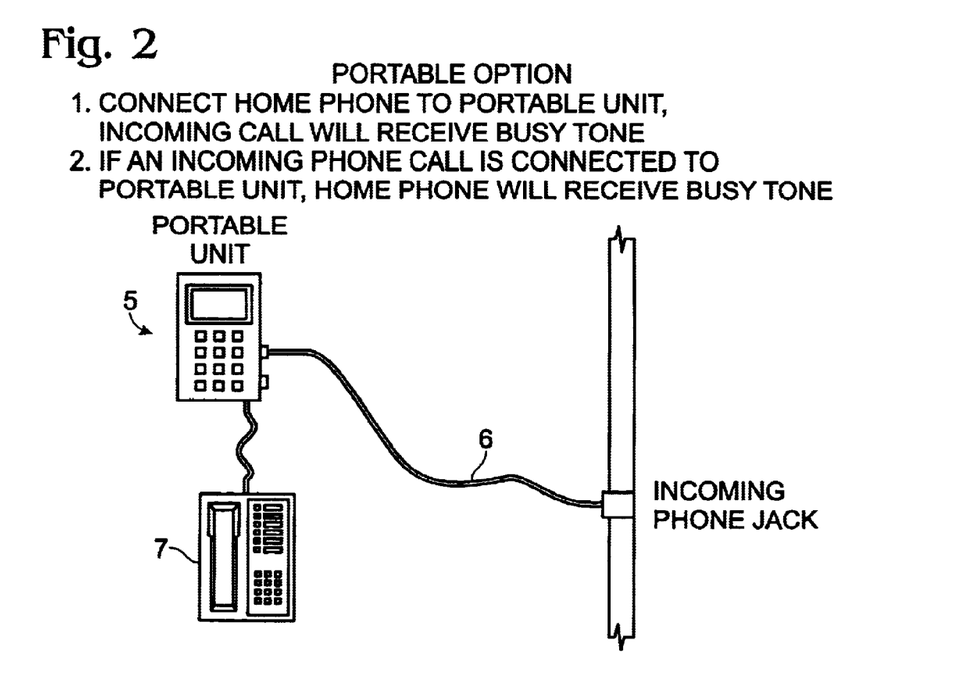
FIG. 2 is a schematic representation of a remote unit for use with an Internet network based telephone call forwarding system embodying the present invention.

Referring to FIGS. 1 and 2, an Internet network based telephone call forwarding system or transfer system embodying the present invention comprises a home unit 1 which is located at a user's normal place of work or domicile and which is connected to a public switch telephone network (PSTN—not shown) by two discrete telephone lines, a first termed an outgoing telephone line 2 and a second termed an incoming telephone line 3. A conventional telephone 4 is also connected to the home unit 1.

A remote unit 5 (or portable unit) is carried with the user or installed, for example, at a location remote to the home unit 1 such as an hotel or the like by a single telephone line 6. A conventional telephone 7 is connected to the remote unit 5.

Figure 3:
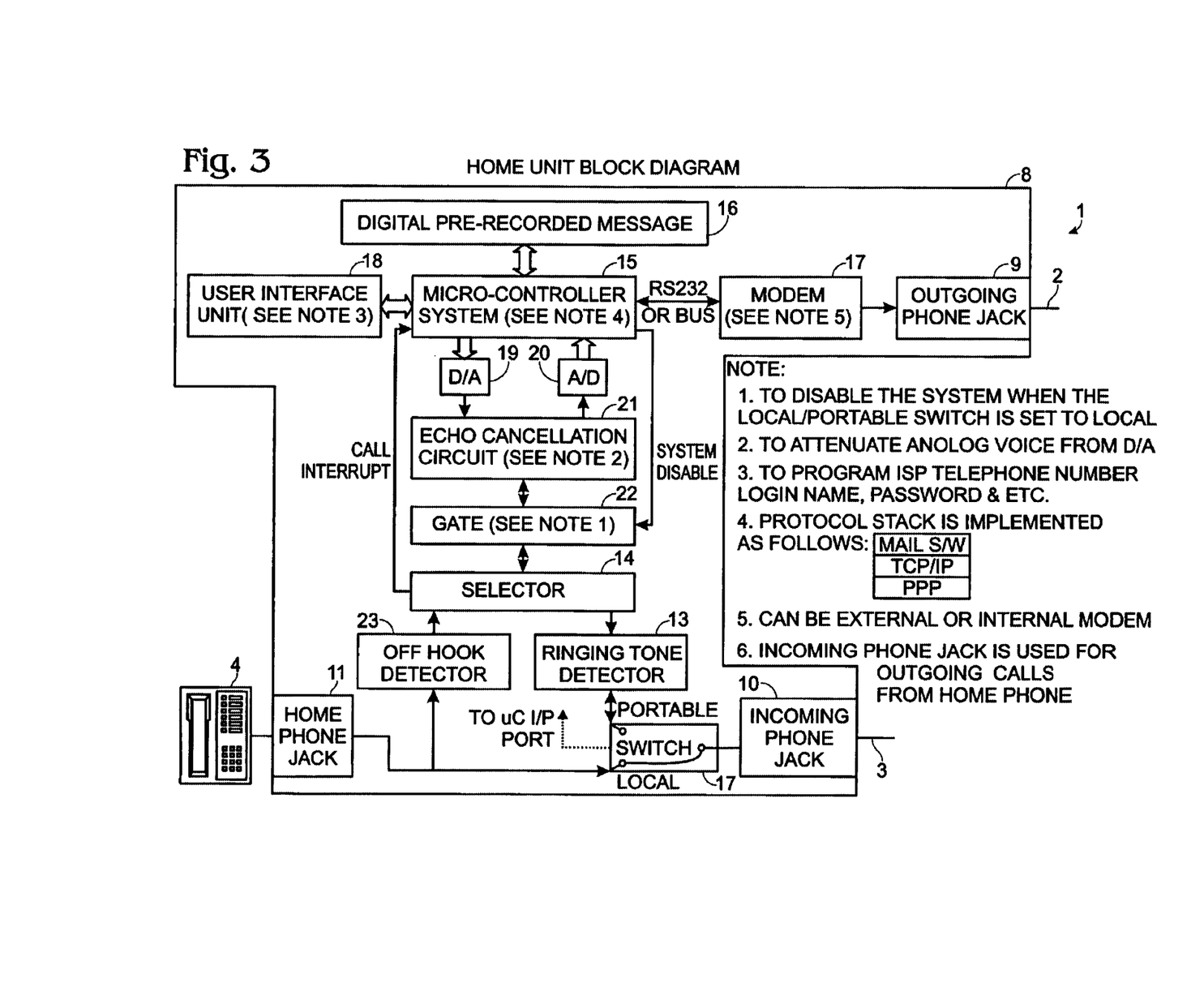
FIG. 3 is a block diagram of the home unit of FIG. 1.

Referring to FIG. 3, the home unit 1 comprises a housing 8 which encloses a first telephone jack 9 connection to the outgoing telephone line 2. A second telephone jack 10 is also enclosed in the housing 8 and provides connection to the incoming telephone line 3. The incoming telephone jack 10 is connected to a home telephone jack 11 into which the conventional telephone 4 is plugged. The incoming telephone jack 10 is connected to the home telephone jack 11 through a switch 12 which has two settings—a local setting and a remote setting. When the switch 12 is in the local setting, incoming calls on the incoming telephone line 3 are switched directly to the conventional telephone 4. However, when the switch 12 is in the remote setting, for example when the user is away from the office or home, then incoming calls are directed to the main circuitry of the home unit so as to transfer or forward the call to the remote unit 5 at the location of the user. The manner in which call forwarding is achieved is described later.

The circuitry of the home unit 1 comprises a ringing tone detector 13 which detects the number of rings on the incoming telephone line 3. After a predetermined number of rings have been detected, the call is patched to a selector 14 and a microcontroller 15 which answers the call and plays a pre-recorded message advising the caller on the incoming line 3 that the call is being transferred. The pre-recorded message is held in a memory 16.

The microcontroller 15 is also connected to a modem 17 which is routed through the outgoing telephone jack 9 to the outgoing telephone line 2.

The home unit 1 is also provided with a user interface unit 18 which is in communication with the microcontroller 15 so as to allow programming of the settings and features of the home unit.

A digital to analogue converters 19 and an analogue to digital converter 20 are connected to the microcontroller 15 such that digital voice packets received by the modem 17 over the outgoing telephone line 2 can be converted into analogue voice signals through the digital to analogue converter 19. Likewise, voice signals on incoming telephone line 3 can be converted to digital voice packets using the analogue to digital converter 20.

An echo cancellation circuit 21 is provided in communication with the analogue to digital and digital to analogue converters 19, 20 so as to attenuate the analogue voice signals from digital to analogue and vice versa. A gate 22 is provided between the echo cancellation circuit 21 and the selector 14 to disable the home unit when the switch 12 is in its local setting.

An off-hook detector 23 is provided between the home telephone jack 11 and selector 14. The off-hook detector 23 detects whether or not the telephone 4 connected to the home unit 1 is off the hook and, if it is off the hook, the home unit 1 behaves as if there is a call arriving at the telephone 4. The person can answer the off-hook telephone 4 and talk to the user at the remote unit, using the telephone 4 handset.

Figure 4:
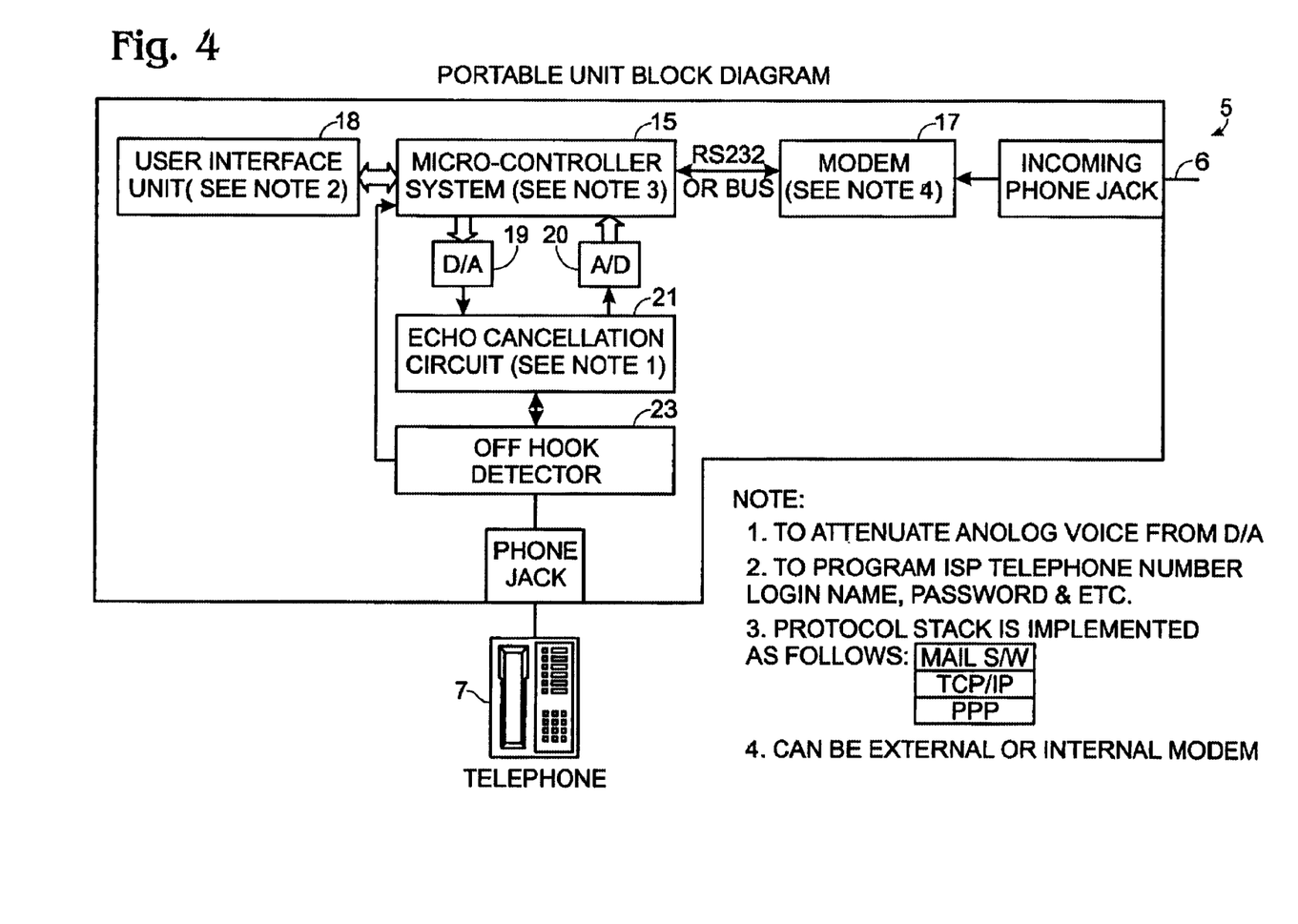
FIG. 4 is a block diagram of the remote unit of FIG. 2.

The remote unit 5 shown in FIG. 4 is of Very similar construction to the home unit 1. However, the remote unit 5 does not include a message memory 16 nor does it include a gate 22 since there is no switch 12 to determine the mode of the remote unit. The same reference numerals used in connection with the home unit 1 shown in FIG. 3 are used to denote the same components of the remote unit 5 shown in FIG. 4.

The above described apparatus comprises the hardware of the Internet-based call forwarding/transfer system. The system has a number of operating modes which can be determined by the user interface units 18 in the home unit 1 and the remote unit 5.

FIGS. 5 to 10 show various modes of operation of the Internet-based call forwarding/transfer systems programmable through the user interface units 18.

Each of the modes comprises a three-stage process to begin, transfer and end a call. The initial process, termed the set-up, is performed prior to a call being received at the home unit 1 and comprises the step of the remote unit 5 identifying itself to the home unit 1. The second step of the procedure is the actual transfer of an incoming call from the home unit 1 to the remote unit 5. The third step is the termination of the call transfer, the so-called tear down.

Figure 5:
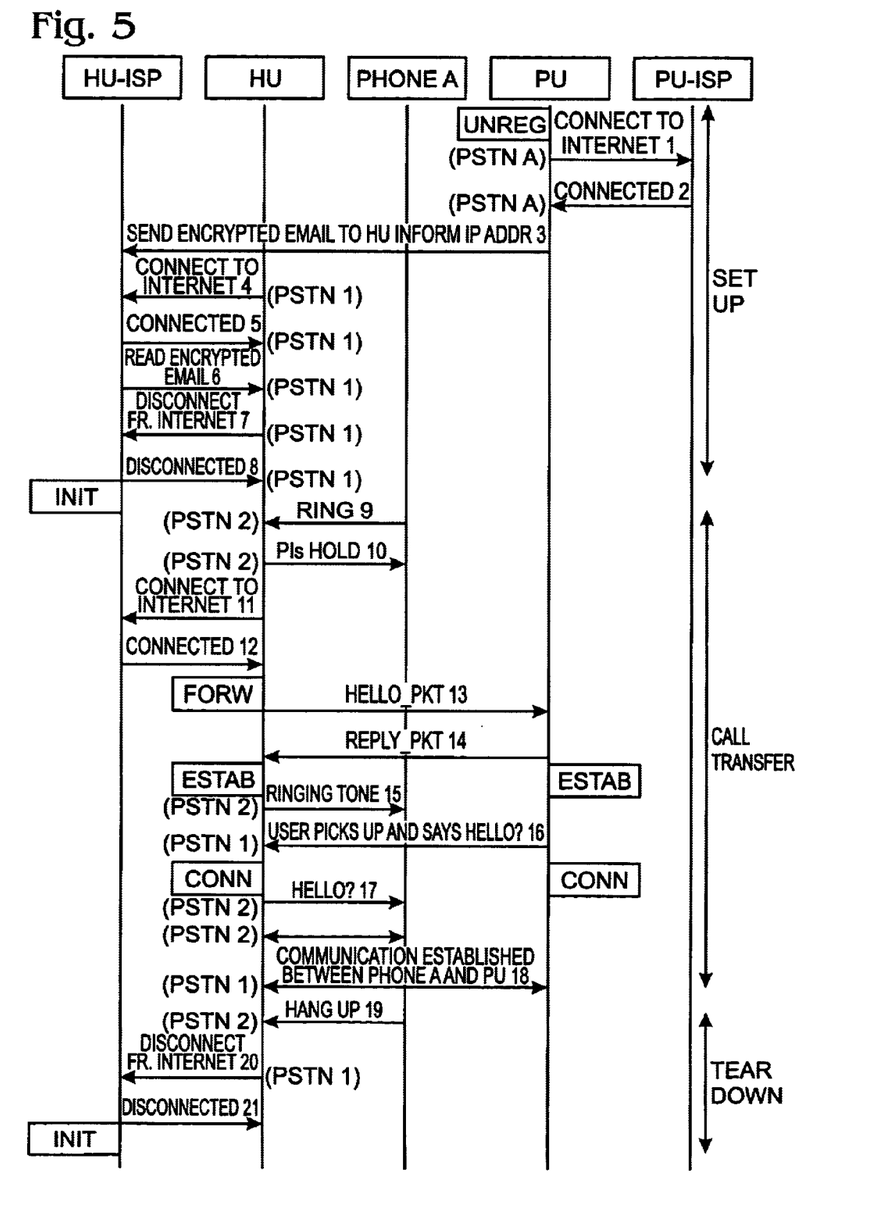
FIGS. 5 to 10 comprise sequence charts for various modes of operation of an Internet network based telephone call forwarding system embodying the present invention.

In operation in accordance with a first operational mode shown in FIG. 5, the home unit has two PSTN connections, the remote unit has a single PSTN connection and there is no dedicated directory server.

In the set-up step, the remote unit uses e-mail services to inform the home unit of its current IP address—that is the address of the site or server to which the remote unit is connected to on the Internet. The remote unit 5 remains connected to the Internet. The e-mail is sent to the Internet service provider for the home unit 1. Subsequently, the home unit 1 connects to the Internet and obtains from its Internet service provider the e-mail containing the site or server address for the remote unit 5. The home unit 1 then disconnects from the Internet now that it has the necessary information to enable contact to be established with the remote unit 5.

When an incoming call is directed to telephone line 3 of the home unit 1, this is recognised by the ringing tone detector 13 which triggers playback of the pre-recorded message stored in the memory 16 so as to advise the caller to hold pending call forwarding. Whilst the caller is holding, the home unit 1 connects to the Internet via its Internet service provider which establishes connection with the remote unit at the site or server address previously indicated to the home unit during the set-up stage. Once communication has been established between the home unit 1 and the remote unit 5, the ringing tone is sounded by the home unit to the caller so that the caller is aware that the transferred call is ringing at the remote unit 5. When the user of the remote unit picks-up the hand set of the remote unit telephone 7, voice packets from the caller and the user at the remote unit 5 are exchanged in digital form over the Internet. In particular, voice information from the telephone 7 of the remote unit 5 is digitised in the analogue to digital converter 20 in the remote unit and sent as voice packets, possibly in a digitally compressed form, to the home unit whereupon the home unit converts the compressed and digitised voice packet to analogue voice data which is output to the caller. Upon termination of the telephone call when the caller or the remote unit 5 hangs up, the tear down or termination of the call transfers is effected by the home unit 1 disconnecting from the Internet.

In accordance with this embodiment of thee system, no dedicated directory server is required at the Internet service provider or elsewhere since the remote unit uses an e-mail to inform the home unit of its telephone number and remains connected to the Internet following the set-up phase.

Since the Internet connection is maintained by the remote unit 5 after the set-up phase, during the call transfer phase and also during the tear-down phase, communication with the remote unit through the Internet can be readily established when the Internet service provider for the home unit requires such communication.

Figure 6:
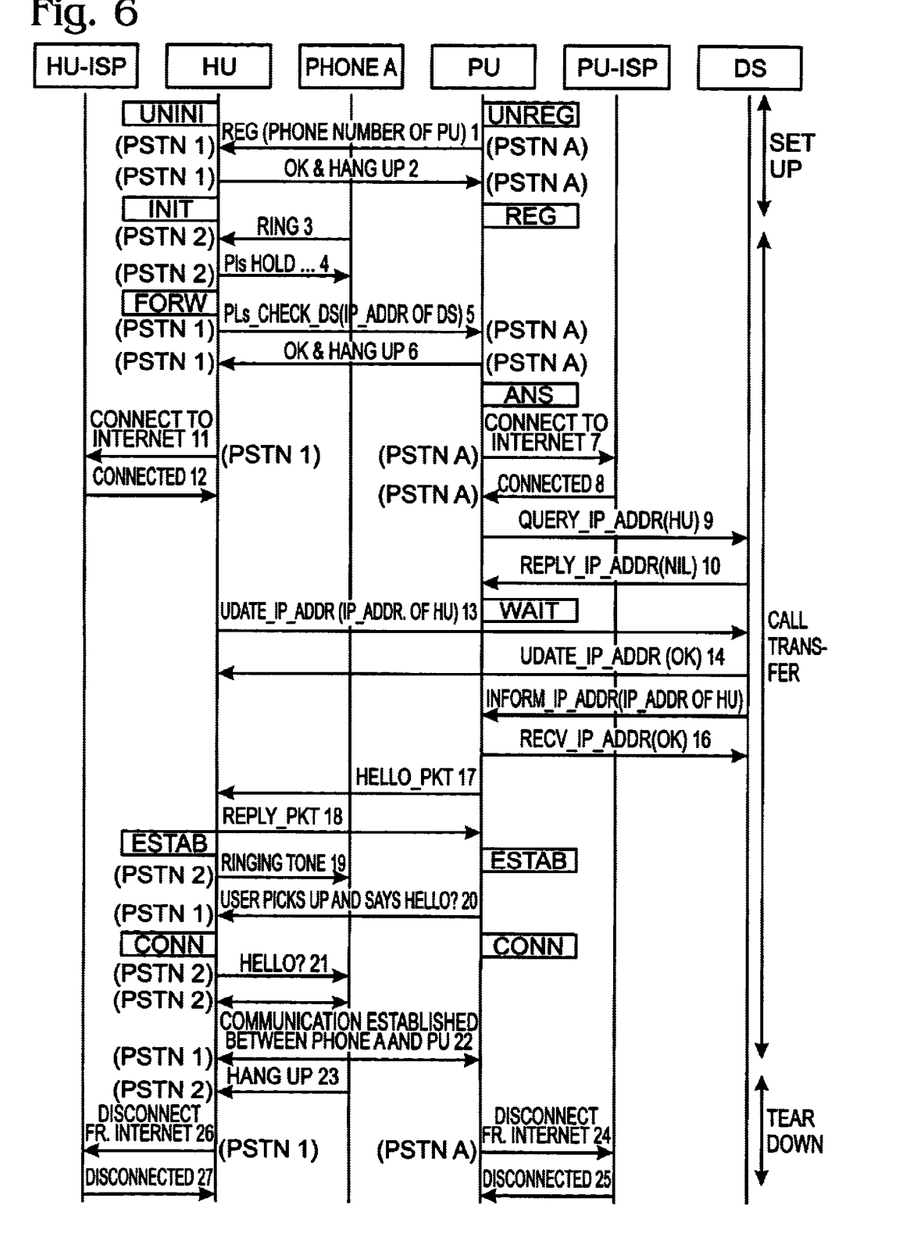

Referring now to FIG. 6, a second operational mode is illustrated in which the home unit has two PSTN connections and the remote unit has a single PSTN connection and there is a dedicated directory server which is always connected to the Internet. The modem 17 of the remote unit 5 makes direct telephone contact with the home unit 1 and transmits the telephone number of the line to which the remote unit is connected. When a caller calls the home unit 1,the message held in the memory 16 is played to the caller advising the caller that the call is being transferred. The modem of the home unit 1 dials directly to the telephone number of the remote unit and advises the Internet address of the directory server contactable by the remote unit. The remote unit then hangs up and both the remote unit and the home unit connect to the Internet. Once both units have established an Internet connection, the remote unit then connects to the home unit via the home unit's directory server whereupon Internet voice telephony can be established in the previously described manner. At the end of the call transfer, tear-down is effected by both the remote unit and the home unit disconnecting from the Internet.

Figure 7:
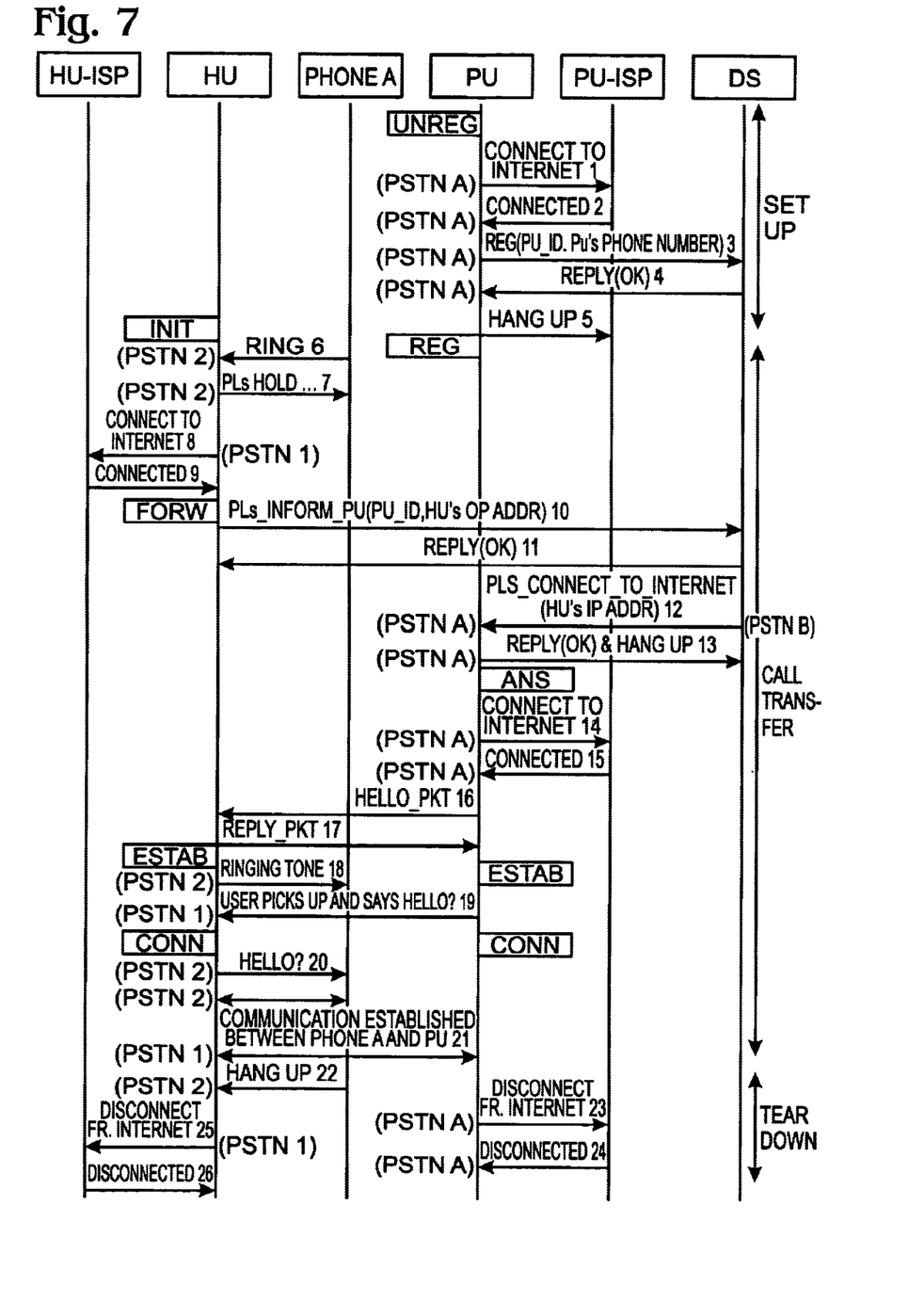

Referring to FIG. 7, a third operational mode is disclosed in which the home unit has two PSTN connections and the remote unit has one PSTN connection and there is a dedicated directory server which is always connected to the Internet and has a single PSTN connection. The set-up phase is effected by the remote unit connecting to the Internet by its Internet service provider and once communication has been established with the Internet, the remote unit advises the directory server of the remote unit's telephone number which is acknowledged by the directory server. The remote unit then hangs up and disconnects from the Internet.

When a caller telephones the home unit 1, the home unit 1 connects to the Internet via its Internet service provider and advises the directory server of its Internet address which is acknowledged by the directory server. The directory server then dials the telephone number of the remote unit and advises the remote unit of the Internet address of the home unit which is acknowledged by the remote unit. The remote unit then hangs up its connection to the directory server and connects to the Internet using its own Internet service provider whereupon both the home unit and remote unit are connected to the Internet and Internet voice telephony can then be established as previously described.

Tear-down is effected by both the remote unit and the home unit disconnecting from the Internet.

Figure 8:
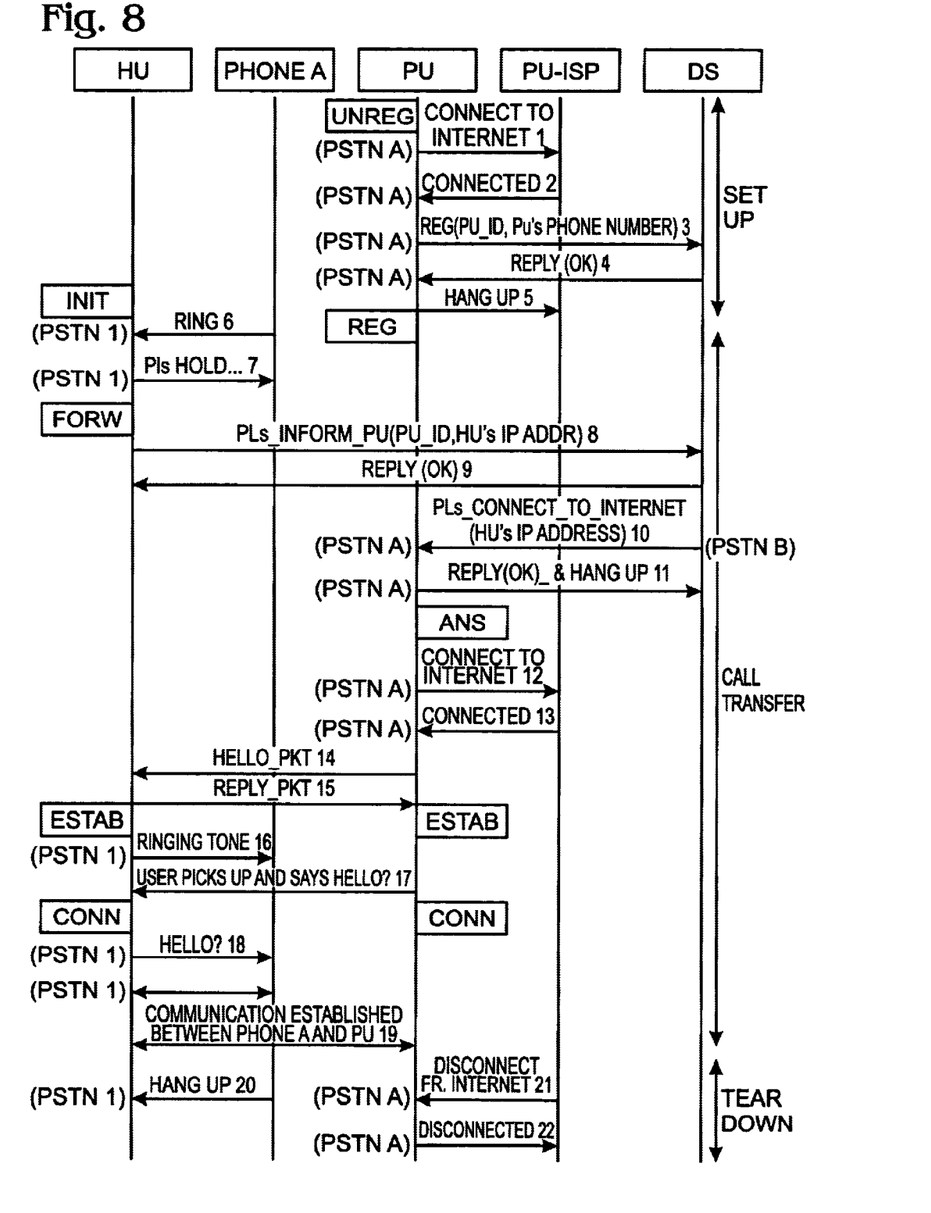

Referring to FIG. 8, a fourth operational mode is disclosed in which the home unit has a permanent connection to the Internet and a single PSTN connection. The remote unit has a single PSTN connection and there is a dedicated directory server which is always connected to the Internet and has a single PSTN connection.

The set-up phase is effected by the remote unit connecting to the Internet via its Internet service provider and advising the directory server of the remote unit telephone number. This is acknowledged by the directory server and the remote unit then hangs up disconnecting from the Internet.

When a caller dials the number of the home unit, the home unit, which is permanently connected to the Internet contacts the directory server to request contact with the remote unit and to advise the remote unit of the Internet address of the home unit. The directory server provides this information to the remote unit via a direct telephone line and the remote unit then connects to the Internet so that Internet voice telephony is established.

Tear-down is effected by the remote unit disconnecting from the Internet and/or the home until being hung-up. Both the home unit and the directory server has a direct connection to the Internet.

Figure 9:
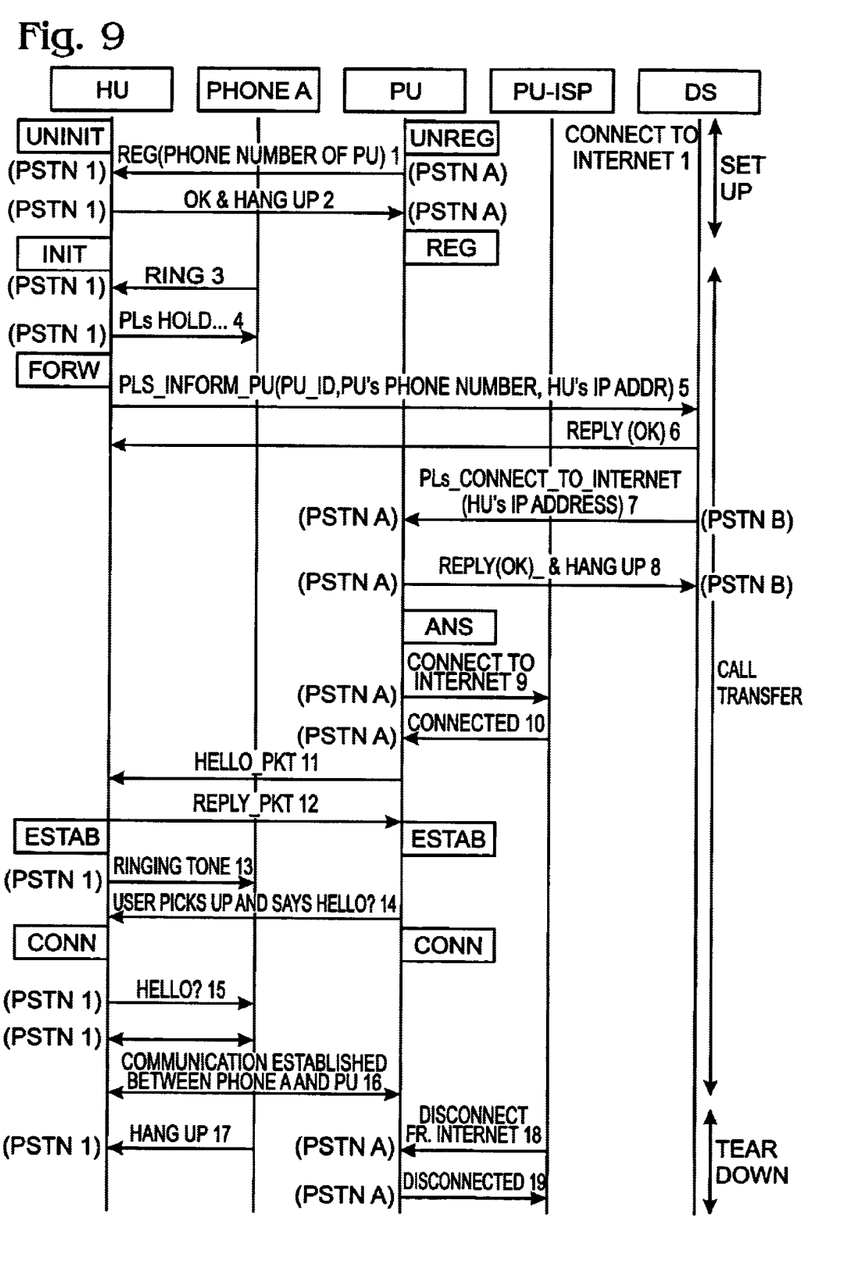

Referring to FIG. 9, a fifth operational mode is described in which the home unit has a permanent connection to the Internet and a single PSTN connection. The remote unit has one PSTN connection and there is a dedicated directory server which is always connected to the Internet and has a single PSTN connection.

The set-up is effected by the remote unit calling directly the home unit and advising the home unit of the telephone number of the remote unit.

When a caller dials the home unit number, the home unit contacts the directory server and advises the directory server of the remote unit to contact, that remote unit's telephone number and the Internet address of the home unit. This information is acknowledged by the directory server which then calls the remote unit and advises the remote unit of the Internet address of the home unit. This information is acknowledged by the remote unit which then hangs up and connects to the Internet via its Internet service provider. Internet voice telephony can then be established between the remote unit and the home unit via the directory server.

During the tear-down stage, the remote unit is disconnected from the Internet and the home unit hangs up its line connection to the directory server.

Figure 10:
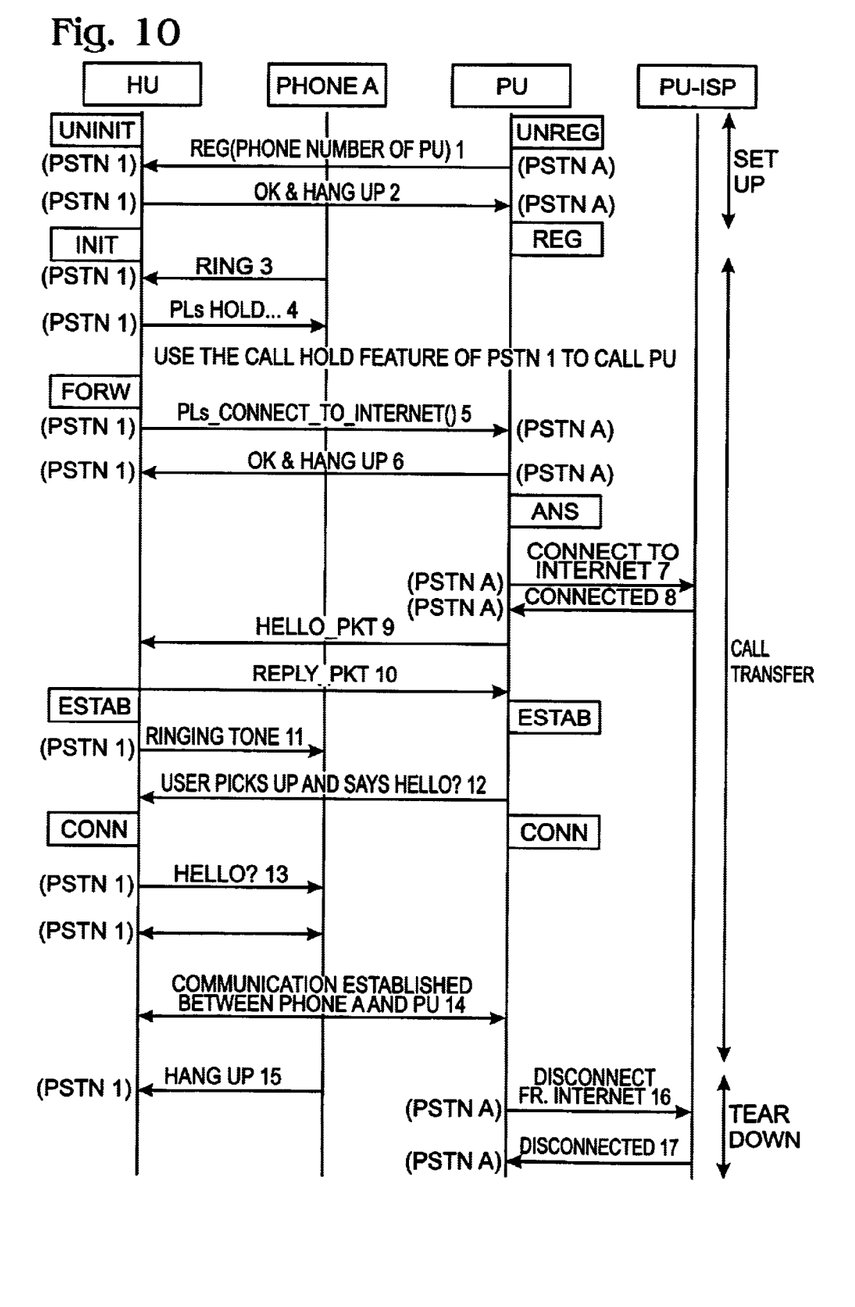

Referring to FIG. 10, another operational mode is disclosed in which the home unit has permanent connection to the Internet and one PSTN connection with a call hold feature. The remote unit has one PSTN connection. In the set-up stage, the home unit uses the call hold feature to inform the remote unit to connect to the Internet when there is a call for the remote unit. Once the home unit has been advised of the telephone number of the remote unit, the set-up phase is completed.

Referring to FIG. 11, a seventh operational mode is disclosed in which the home unit has permanent connection to the Internet and one PSTN connection with a call hold feature. The remote unit has one PSTN connection. In the set-up stage, the home unit uses the call hold feature to inform the remote unit to connect to the Internet when there is a call for the remote unit. Once the home unit has been advised of the telephone number of the remote unit, the set-up phase is completed.

When a caller rings the home unit, the call hold feature of the home unit telephone line is utilised to hold the call and then call the remote unit and to advise the remote unit to connect to the Internet. This information is acknowledged by the remote unit which then connects to the Internet whereupon Internet voice telephony can be established between the remote unit and the home unit which is permanently connected to the Internet.

Tear-down is effected by the remote unit disconnecting from the Internet and by the caller hanging up the line to the home unit.

Thus, it can be appreciated that the above described embodiments of the invention allow Internet-based telephone call forwarding or transfer—a concept which heretobefore was not possible. More preferably, some of the above-described embodiments permit Internet-based telephone call forwarding or transfer without the use of a directory server or the like.

What is claimed is:

1. A method of forwarding calls to a user using an Internet network based telephone call forwarding system comprising a home unit of the user to which telephone calls are directed and a remote unit to which telephone calls are forwarded from the use's home unit, wherein the user's home unit has an incoming line connectable to a telephone network and an outgoing line connectable to an Internet network and the remote unit has a line connectable to the Internet network, which method comprises the steps of advising the user's home unit of the contact number and/or Internet address of the remote unit; receiving a call including incoming speech signals on the incoming line of the user's home unit; digitising, encoding and packetising the incoming speech signals into speech packets; and forwarding the call to the contact number and/or Internet address remote unit on the outgoing line via the Internet network thereby sending the speech packets to the remote unit.

2. A method according to claim 1, wherein the remote unit sends the home unit an e-mail containing the contact number and/or Internet address of the remote unit.

3. A method according to claim 1, wherein the remote unit advises the home unit of the contact number of the remote unit by a telephone call.

4. A method according to claim 3, wherein the home unit has a caller identification function and can determine the contact number of the remote unit from the telephone call to the home unit.

5. A method according to claim 1 comprising the steps of the remote unit sending a message containing the contact number of the remote unit to a dedicated server contactable by the home unit and the dedicated server interrogating the home unit to provide the contact number of the remote unit to the home unit.

6. A method according to claim 1, comprising the steps of the home unit answering a call and advising the caller that the call is being forwarded to the remote unit.

7. A method according to claim 1, wherein the home unit establishes a connection to a local Internet service provider to set up a connection to the remote unit via the Internet.

8. A method according to claim 1, wherein the remote unit sends speech packets to the home unit and the home unit de-packetises, decodes and converts to analogue the speech packets from the remote unit and transmits the analogue speech signals to the caller via the incoming line.

9. A method according to claim 1, wherein the remote unit de-packetises, decodes and converts to analogue the speech packets from the home unit.

10. A method according to claim 9, wherein a telephone is connected to the remote unit and the remote unit transmits the analogue speech signals to the user of the remote unit.

11. A method according, to claim 10, wherein the remote unit digitises, encodes and packetises incoming speech signals from the user of the remote unit and sends the speech packets to the home unit.

12. A method according to claim 1 comprising the steps of, when a call is to be forwarded to the remote unit, the remote unit being permanently connected to the Internet network: the home unit connecting to the Internet network and sending a control packet to the remote unit to advise the user of the remote unit of a call being forwarded to the remote unit.

13. A method according to claim 1 comprising the steps of, when a call is to be forwarded to the remote unit: the home unit telephoning the remote unit to advise the remote unit to contact a dedicated server, both units then hanging up, both units then connecting to the Internet network and establishing connection between them using contact number and/or Internet address information obtained from the dedicated server.

14. A method according to claim 1 comprising the steps of, when a call is to be forwarded to the remote unit: the home unit connecting to the Internet network and to a dedicated server having a telephone line; the dedicated server telephoning the remote unit to inform the remote unit that a call is waiting to be forwarded; the dedicated server and the remote unit both hanging up; and the remote unit connecting to the Internet network to receive the forwarded call.

15. An Internet network based telephone call forwarding system comprising a home unit to which a user's telephone calls, including incoming speech signals, are directed, a remote unit to which a user's telephone calls are forwarded and means to advise the home unit of the contact number and/or Internet address of the remote unit wherein the home unit has an incoming line connectable to a telephone network and an outgoing line connectable to an Internet network and the remote unit has a line connectable to the Internet network, wherein the home unit is operable to digitise, encode and packetise the incoming speech signals into speech packets and forward calls directed to the home unit on the incoming line to the contact number and/or Internet address of the remote unit on the outgoing line via the Internet network thereby sending the speech packets to the remote unit.

16. A system according to claim 15, wherein the home unit has a switch to enable or disable call forwarding.

17. A system according to claim 15, wherein the home unit is provided with a ring detector to detect incoming calls.

18. A system according to claim 15, wherein the home unit is provided with an off hook detector to detect when a telephone connected to the home unit is off the hook and, in response to said detection, to forward a call to the remote unit.

19. A system according to claim 15, wherein the home unit is connected by the incoming line and the outgoing line to a public switched telephone network (PSTN).

20. A system according to claim 15, wherein the remote unit is connected to a PSTN.

21. A system according to claim 15, wherein a dedicated server is provided having one PSTN connection to contact the remote unit upon a call being forwarded to the remote unit.

* * * * *